United States Patent [19]

Levrai et al.

[11] Patent Number: 4,798,127

[45] Date of Patent: Jan. 17, 1989

[54] TANDEM BRAKE PRESSURE CONTROL VALVE WITH PRESSURE-FAILURE-COMPENSATING PARALLEL PISTON

[75] Inventors: Roland Levrai, Stains; Pascal Picot, Bonnevil sur Marne; Christian Riquart, Paris, all of France

[73] Assignee: Bendix France, Drancy, France

[21] Appl. No.: 54,453

[22] Filed: May 26, 1987

[30] Foreign Application Priority Data

May 28, 1986 [FR] France ................... 86 07619

[51] Int. Cl.⁴ ............... B60T 13/14; B60T 15/02; F15B 17/02
[52] U.S. Cl. .................................. 91/530; 91/460; 60/589
[58] Field of Search ............ 91/460, 510, 530, 280; 60/550, 565, 589, 533

[56] References Cited

U.S. PATENT DOCUMENTS 3,918,765 11/1975 Hayashida ..................... 91/460
4,671,168 6/1987 Sauvee ......................... 91/460

FOREIGN PATENT DOCUMENTS 2164879 8/1973 France .
2404552 4/1979 France .
2424160 11/1979 France .
2558785 4/1985 France .
2051985 1/1981 United Kingdom .

Primary Examiner—Robert E. Garrett
Assistant Examiner—George Kapsalas
Attorney, Agent, or Firm—Larry J. Palguta; Ken C. Decker

[57] ABSTRACT

Hydraulic assistance device for brake actuation comprising a body (10) having a bore (12) in which first and second piston mechanisms (34, 56) are slidably mounted, the first piston mechanism (34) being displaceable under the effect of the actuation of a third piston (16) mounted slideably in the bore (12), and the second piston mechanism (56) being displaceable by way of a hydrostatic connection formed in a presure chamber (60) defined between the first and the second piston mechanism (34, 56), there being associated with each piston mechanism (34, 56) a respective valve mechanism (52, 78) in a respective hydraulic circuit between a fluid source under pressure (54, 84) and a respective brake circuit (62,88), and a third chamber (30) defined in the bore (12) between the first piston mechanism (34) and the third piston (16), characterized in that the third chamber (30) is partially delimited by a fourth piston (92) which is displaceable under the effect of the pressure in the third chamber (30) as it meets a first spring mechanism (102; 104, 144).

7 Claims, 3 Drawing Sheets

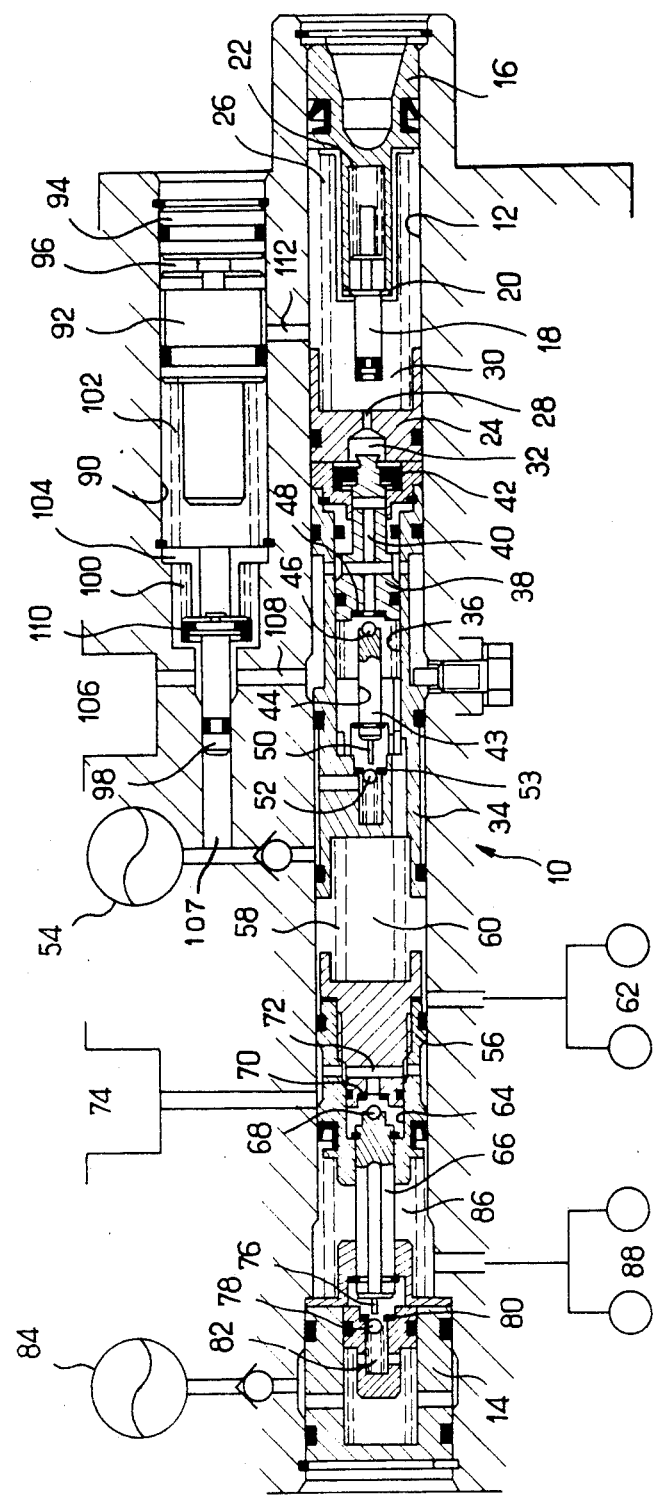
FIG_1

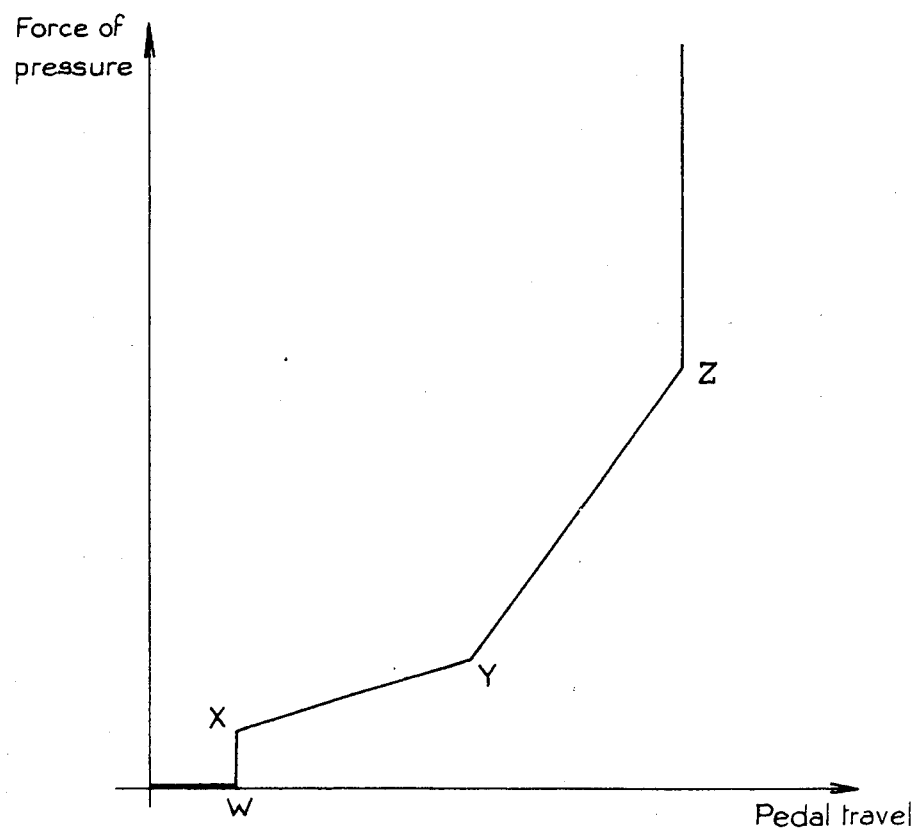
FIG_2

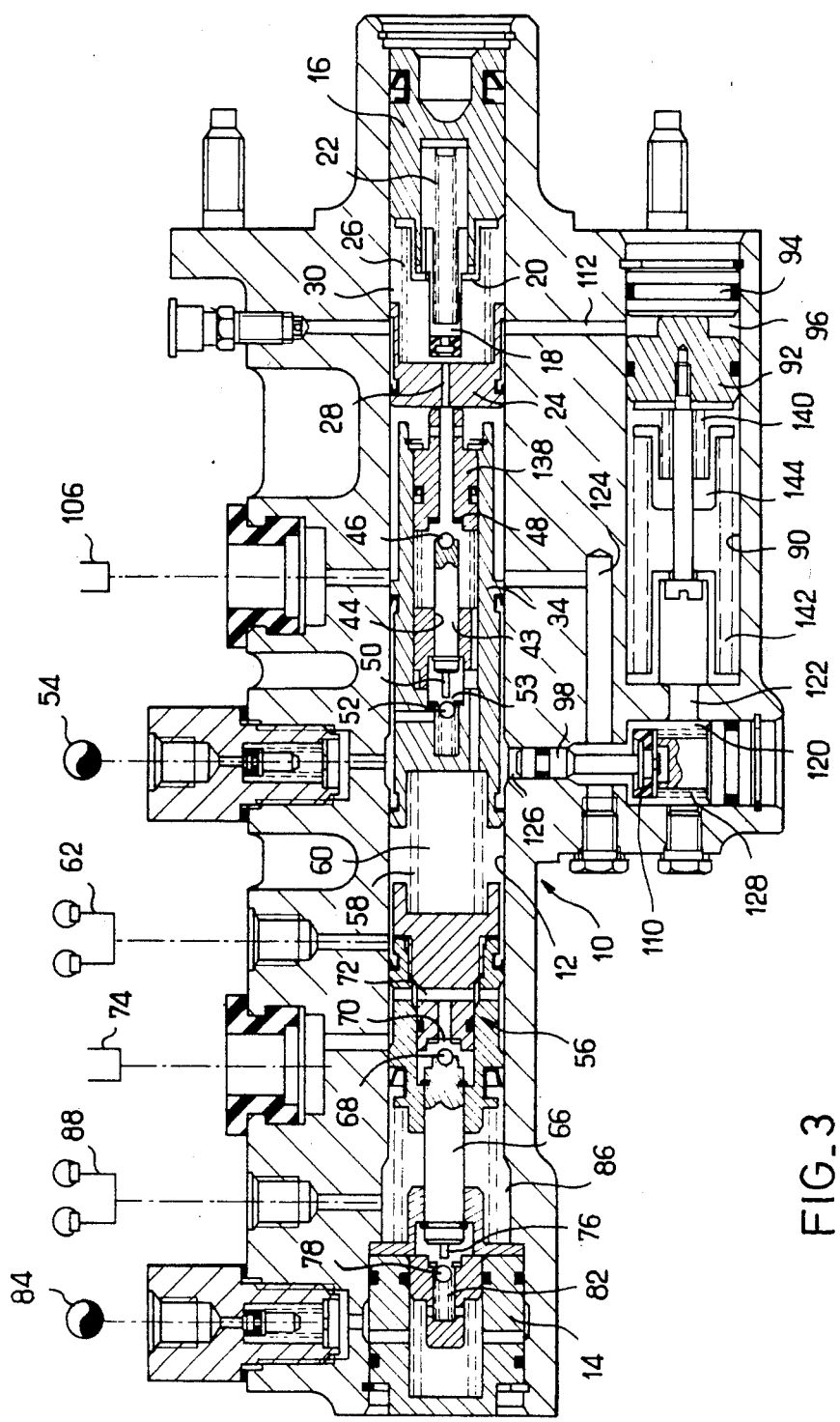
FIG_3

TANDEM BRAKE PRESSURE CONTROL VALVE WITH PRESSURE-FAILURE-COMPENSATING PARALLEL PISTON

BACKGROUND OF THE INVENTION

1. FIELD OF THE INVENTION

The present invention relates to hydraulic brake assistance devices and more particularly to such a device for a dual brake circuit of mixed hydrodynamic (known as "full power") and hydrostatic operation.

2. DESCRIPTION OF THE PRIOR ART

A so-called "full power" hydraulic assistance device is known from French Patent Application No. 8,502,824, filed on Feb. 27, 1985, which device comprises two piston means delimiting two master cylinder chambers and each having a return valve means to the tank. The device also comprises two high pressure valve means, a first incorporated in the first piston means and a second in an element closing the bore of the device. The device may function in the hydrodynamic mode and, in the event of failure of a high pressure circuit, in the hydrostatic mode as a conventional master cylinder.

Despite its advantages, this device has minor drawbacks in that the pedal travel perceived by the driver of the vehicle is too short. Modern vehicle manufacturers request that the pedal travel should be more progressive in order to improve driving comfort.

SUMMARY OF THE INVENTION

A subject of the present invention is therefore to provide a hydraulic assistance device of the mixed or so-called "full power" type which is nevertheless capable of operating as a conventional master cylinder in the event of failure of a high pressure circuit and having a more progressive pedal travel.

To achieve this, the invention relates to a hydraulic assistance device comprising a body having a bore in which a first and a second piston means are mounted slideably, the first piston means being displaceable under the effect of the actuation of a third piston mounted slideably in the bore, and the second piston means being displaceable by means of a hydrostatic connection formed in a pressure chamber defined between the first and the second piston means, there being associated with each piston means a respective valve means in a respective hydraulic circuit between a fluid source under pressure and a respective brake circuit, and a third chamber defined in the bore between the first piston means and the third piston, characterized in that the third chamber is partially delimited by a fourth piston which is displaceable under the effect of the pressure in the third chamber as it meets a first spring means.

BRIEF DESCRIPTION OF THE DRAWINGS

The present invention will now be described by way of example with reference to the accompanying drawings, in which:

FIG. 1 is a view in longitudinal section of a hydraulic assistance device according to a first embodiment;

FIG. 2 is a curve representing the pedal travel as a function of the input force of the device of FIG. 1; and, FIG. 3 is a view in longitudinal section of a device according to a second embodiment.

DETAILED DESCRIPTION OF THE PREFERRED EMBODIMENTS

As shown in FIG. 1, the hydraulic assistance device, which in the example shown is a master cylinder for brake circuits, comprises a body 10 having a multistage bore 12 sealed at one end by a closing element 14. Mounted sealingly and slideably in the bore 12 is a first piston 16 intended to be connected to a brake pedal (not shown). Mounted slideably in the first piston 16 is a flap element 18 which is stressed towards a position in which it comes up against a shoulder 20 by means of a spring 22. A second piston 24 is mounted sealingly and slideably in the bore 12 and is coupled to the first piston 16 by a spring 26. The second piston 24 has an axial passage 28 which connects a first chamber 30, defined between the first and second pistons 16, 24, to an intermediate chamber 32.

The intermediate chamber 32 is delimited by a first piston means 34 which has a multi stage bore 36 in which a flap assembly 38 is slideably mounted. The flap assembly 38 has a passage 40 which is intended to be closed by a seal 42 which comes up against the first piston means 34 when the flap assembly 38 moves in the bore 36. A push rod 43 is mounted slideably in a second axial bore 44 in the first piston means 34 and has, at one end, a ball 46 which is intended to interact with a seal 48 in the flap assembly 38. At its other end, the push rod 43 has an actuating rod 50 which is intended to free a ball 52 from its seat 53 thus opening a hydraulic passage between a fluid source 54 under pressure and the inside of the bore 36.

Moreover, the device comprises a second piston means 56 mounted slideably in the bore 12 and coupled to the first piston means 34 by a spring 58. A first working chamber 60 is formed between the first and second piston means 34, 56 and is connected to a first brake circuit 62. The second piston means 56 comprises a multi stage bore 64 in which a push rod 66 is mounted slideably with play, which push rod has at one end a ball 68 capable of closing a seat 70 in a passage 72 between the multi stage bore 64 and a low pressure tank 74. At its other end, the push rod 66 has an actuating rod 76 which is capable of freeing a ball 78 from its seat 80 in a passage 82 between a fluid source under pressure 84 and a second working chamber 86 which is connected to a second brake circuit 88.

According to the invention, the device comprises a multi stage bore 90 arranged beside the bore 12 and in which a fourth piston 92 is mounted slideably, which fourth piston defines a chamber 96 by means of a closing element 94. A flap means 98 is mounted sealingly and slideably in the bore 90 and is connected to the fourth piston 92 by means of a dual spring assembly 100 and 102 and a casing 104 mounted fixedly in the bore 90. One end 107 of the bore 90 is in hydraulic communication with the source 54 and the bore on the other side of the flap means 98 is in hydraulic communication with a low pressure tank 106 which is also connected to the bore 12 by a passage 108. The flap means 98 has a seal 110 which is intended to close the hydraulic passage between the bore 90 and the tank 106 during a movement of the flap means 98. The chamber 96 is connected to the first chamber 30 by a passage 112.

The mode of operation of the device thus described is as follows. A force applied by the brake pedal on the piston 16 is transmitted by means of the spring 26 to the second piston 24 which moves to the left (looking at the drawings), causing the displacement of the flap assembly 38. The displacement of the flap assembly 38 causes the seat 48 to be closed by means of the ball 46. The first working chamber 60 is thus isolated from the tank 106, but the intermediate chamber 32 remains in communication with the tank 106 and the first chamber 30, the seal 42 remaining open. This position corresponds to the point W on the curve in FIG. 2. If the force on the pedal continues to increase, the rod 50 of the push rod 43 frees the ball 52 from its seat 53 (point X on the curve), allowing the fluid under pressure to pass through the first working chamber 60 towards the first brake circuit 62. The pressure increases in the first working chamber 60 leads to the displacement of the second piston means 56, causing the seat 70 to be closed by means of the ball 68 and the ball 78 to be opened by the rod 76. The hydraulic passage between the high pressure source 84 and the second brake circuit 88 is thus opened.

If the force on the pedal continues, the spring 26 bends, allowing a pedal travel shown in FIG. 2 between the points X and Y. The fluid in the first chamber 30 is forced back through the passages 28 and 40 towards the tank 106. At the end of this travel, the flap element 18 closes the passage 28, thereby isolating the first chamber 30 from the low pressure tank 106. This position corresponds to the point Y on the curve in figure 2. From this point, the fluid in the first chamber 30 passes through the passage 112 towards the chamber 96, causing the displacement of the fourth piston 92 as it meets the spring 102. The pedal travel increases to the point Z on the curve, which corresponds to the point at which the first piston 16 comes up against the second piston 24 by means of the push rod 18.

In the event of a failure of the high pressure source 54, the flap means 98 moves to the left (looking at the drawings) under the effect of the spring 100 and the seal 110 closes the passage between the bore 90 and the tank 106. The fourth piston 92 is thus immobilized. When the device is activated, the first piston 16 moves, causing the seat 48 to be closed by means of the ball 46 and freeing the ball 52 from its seat 53. As there is no high pressure obstructing the displacement of the flap assembly 38, the latter continues to slide until the seal 42 comes up against the first piston means 34, thereby closing the passage between the intermediate chamber 32 and the low pressure tank 106. As the fluid in the first chamber 30 is incompressible, the first piston 16 and the first piston means 34 move together, sending the fluid in the first working chamber 60 towards the first brake circuit 62 and displacing the second piston means 56.

In the second embodiment shown in FIG. 3, the elements which are identical or similar to those in figure 1 bear the same reference numerals.

The device in FIG. 3 differs from that in figure 1 in that the flap assembly 138 is not provided with a seal 42. The fourth piston 92 is stressed towards its position in which it comes up against the closing element 94 by a dual spring assembly 140 and 142 and a casing 144 arranged directly in the bore 90. The bore 90 is connected to a chamber 120 by an opening 122. The chamber 120 communicates with the low pressure tank 106 by means of a passage 124. A flap means 98 is mounted sealingly slideably in a passage 126 in communication with the high pressure source 54, and has a seal 110 intended to close the passage 124 between the chamber 120 and the tank 106 under the effect of a spring 128.

When the device is activated, the piston 16 moves and the flap element 18 comes up against the second piston 24, isolating the first chamber 30 from the reservoir 106. The resulting displacement of the first piston 16 sends the fluid in the first chamber 30 through the passage 112 towards the chamber 96, causing the displacement of the fourth piston 92. The displacement of the fourth piston 92 initially compresses the two springs 140 and 142. As the spring 140 is weaker than the spring 142, the fourth piston comes up against the casing 144. The displacement of the fourth piston 92 beyond this position compresses the spring 142 only. This successive compression of the two springs 140 and 142 creates a broken slope which is substantially identical with that in FIG. 2.

In the event of a failure of the high pressure source 54, the flap means 98 closes under the effect of the spring 128, thereby isolating the chamber 120 and the bore 90 from the low pressure tank 106. The piston valve is thus rendered immobile.

It can therefore be stated that, in accordance with the subject of the invention, a progressive pedal travel is ensured.

We claim:

1. A hydraulic assistance device, comprising a body having a first bore in which first and second piston means are mounted slidably, the first piston means displaceable under the effect of the actuation of a third piston mounted slidably in the bore, the second piston means displaceable by means of a hydrostatic connection formed in a working chamber defined between the first and second piston means, there being associated with the first and second piston means respective piston valve means in respective hydraulic circuits between a fluid source under pressure and a respective brake circuit, a first chamber defined in the bore between the first piston means and third piston and connected to a tank of fluid under low pressure through valve means which closes after a predetermined displacement of said third piston, a second bore in which a fourth piston is mounted slidably in order to define together with a closed first end of said second bore a second chamber in hydraulic communication with said first chamber, a second end of said second bore being in hydraulic communication with the low pressure tank through second valve means controlled by fluid pressure of the fluid source under pressure, said fourth piston being displaceable by the fluid pressure in the first chamber, and the fourth piston biased by first spring means.

2. The device according to claim 1, wherein respective second spring means oppose displacements of the third piston and fourth piston.

3. The device according to claim 2, wherein one of said second spring means is disposed in said second bore.

4. The device according to claim 3, wherein the one second spring means is rendered inactive when hydrostatic pressure causes the fourth piston to engage a casing after a predetermined displacement of said fourth piston.

5. The device according to claim 2, wherein the first spring means and one of the second spring means are disposed in series within the second bore.

6. The device according to claim 2, wherein the second end of the second bore communicates with the low pressure tank via the second valve means and the first bore.

7. The device according the claim 2, wherein one of the second spring means is disposed in the first chamber.

* * * * *